(12) United States Patent
Hasselblad et al.

(10) Patent No.: US 9,102,307 B2
(45) Date of Patent: Aug. 11, 2015

(54) SAFETY ARRANGEMENT FOR A VEHICLE

(71) Applicant: Volvo Car Corporation, Gothenburg (SE)

(72) Inventors: Harald Hasselblad, Gothenburg (SE); Linus Wagstrom, Nodinge (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 14/099,639

(22) Filed: Dec. 6, 2013

(65) Prior Publication Data

US 2014/0158450 A1    Jun. 12, 2014

(30) Foreign Application Priority Data

Dec. 12, 2012    (EP) .................................... 12196736

(51) Int. Cl.
*B60K 28/10*    (2006.01)
*B60R 21/38*    (2011.01)

(52) U.S. Cl.
CPC ...................................... *B60R 21/38* (2013.01)

(58) Field of Classification Search
CPC .......... B60R 21/34; B60R 21/36; B60R 21/38
USPC .................. 180/271, 274, 69.21; 296/187.04
See application file for complete search history.

(56) References Cited

U.S. PATENT DOCUMENTS

| | | | |
|---|---|---|---|
| 6,182,782 B1 * | 2/2001 | Matsuura et al. | 180/274 |
| 6,237,992 B1 * | 5/2001 | Howard | 296/187.04 |
| 6,386,623 B1 * | 5/2002 | Ryan et al. | 296/187.04 |
| 6,467,563 B1 * | 10/2002 | Ryan et al. | 180/274 |
| 6,499,555 B2 * | 12/2002 | Ishizaki et al. | 180/274 |
| 6,600,412 B2 * | 7/2003 | Ishizaki et al. | 180/274 |
| 6,712,169 B2 * | 3/2004 | Ryan et al. | 180/274 |
| 7,455,147 B2 * | 11/2008 | Brei et al. | 180/274 |
| 7,997,375 B2 | 8/2011 | Shaw | |
| 8,267,216 B2 * | 9/2012 | Browne et al. | 180/274 |
| 2003/0042714 A1 | 3/2003 | Sawa | |
| 2004/0183629 A1 * | 9/2004 | Mizoguchi et al. | 333/219 |
| 2005/0279550 A1 * | 12/2005 | Saville et al. | 180/69.21 |
| 2006/0175115 A1 * | 8/2006 | Howard | 180/274 |
| 2010/0300792 A1 * | 12/2010 | Yuan et al. | 180/274 |

FOREIGN PATENT DOCUMENTS

DE    10141730 A1    3/2003

OTHER PUBLICATIONS

European Patent Office, Extended European Search Report of EP12196736, Germany, Feb. 26, 2013, 6 pages.

* cited by examiner

*Primary Examiner* — Paul N Dickson
*Assistant Examiner* — Robert A Coker
(74) *Attorney, Agent, or Firm* — Alleman Hall McCoy Russell & Tuttle LLP

(57) ABSTRACT

A safety arrangement for a vehicle comprises a bonnet and at least one support member. In case of a collision between the vehicle and a large animal, the bonnet is supported from beneath by the at least one support member in at least a rear central portion, such that the bonnet forms a ramp for the large animal, the ramp being adapted to direct the large animal over a windscreen and/or a roof structure of the vehicle. A method of mitigating the consequences of a collision between a vehicle and a large animal may be employed in conjunction with the safety arrangement.

15 Claims, 7 Drawing Sheets

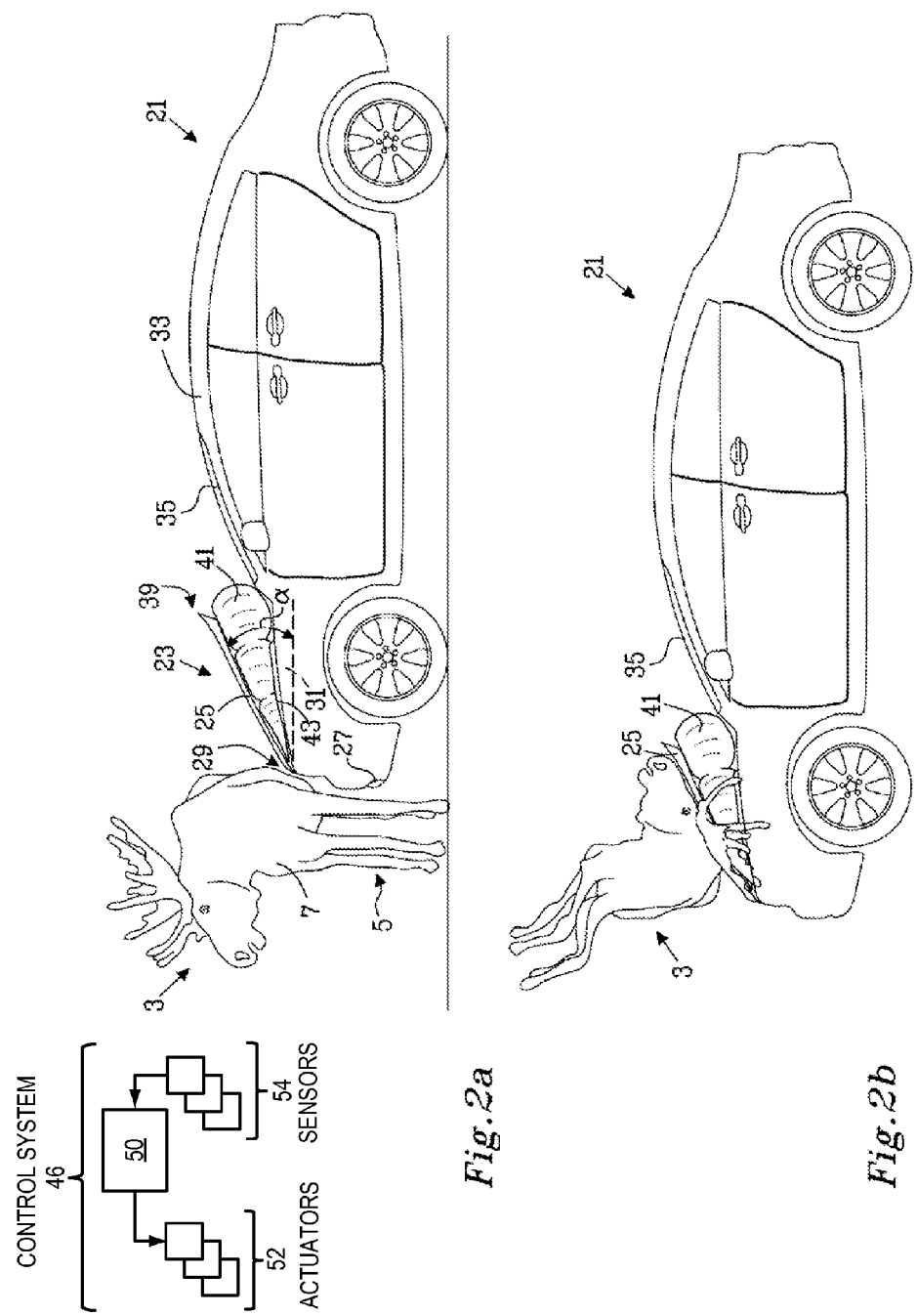

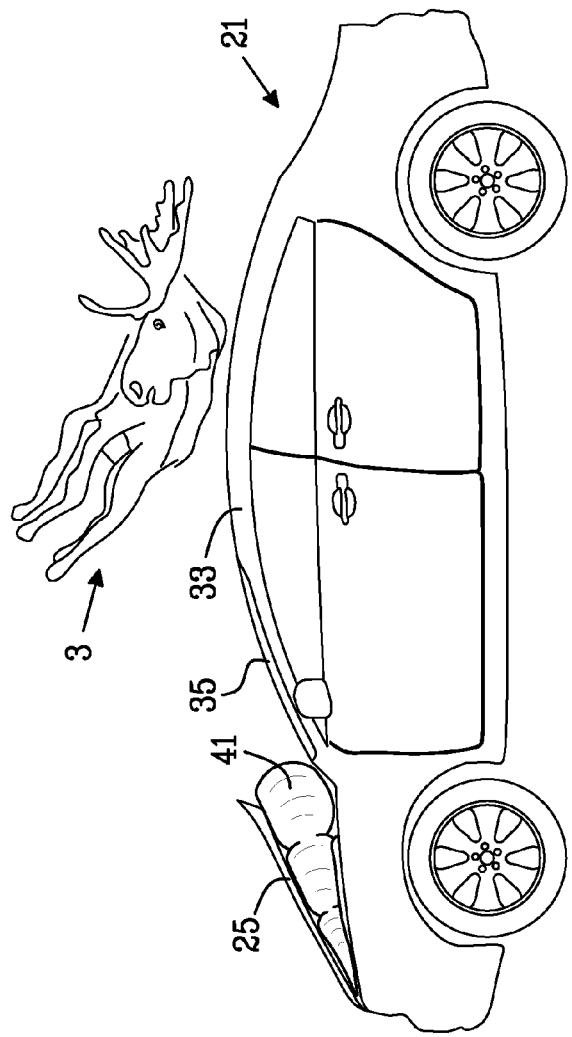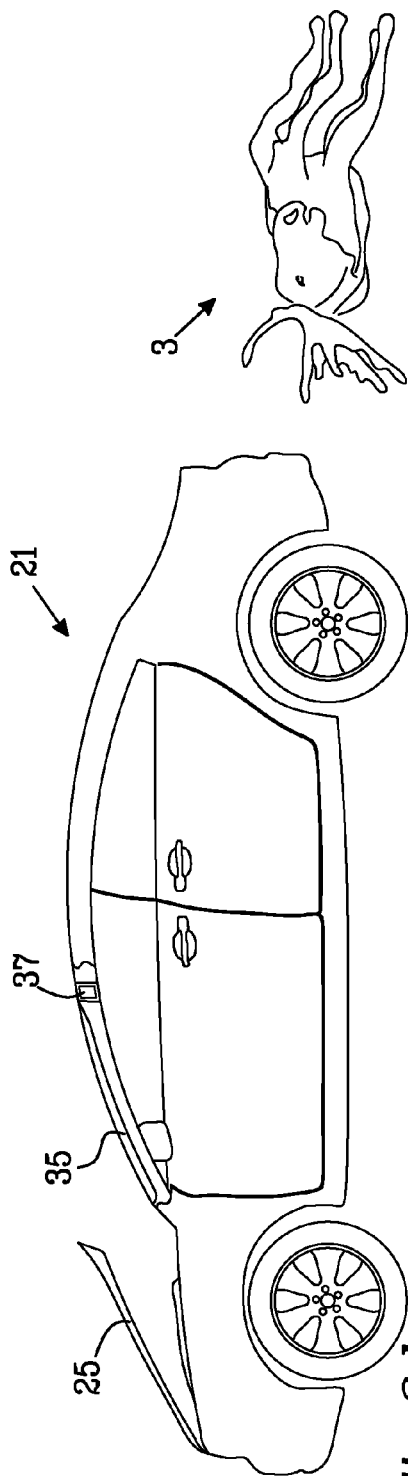
Fig.2c
Fig.2d

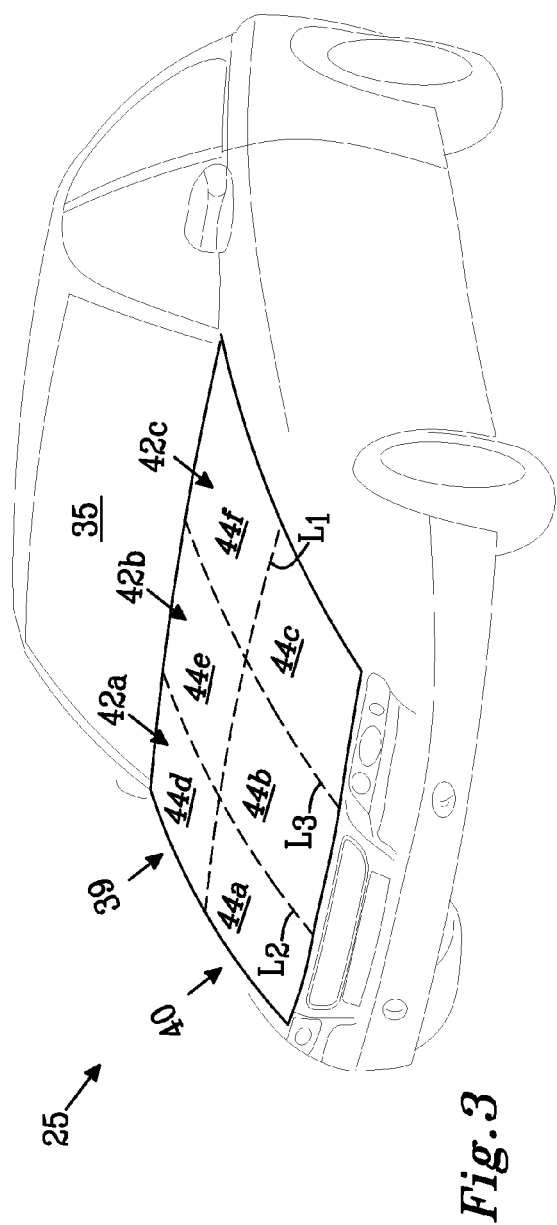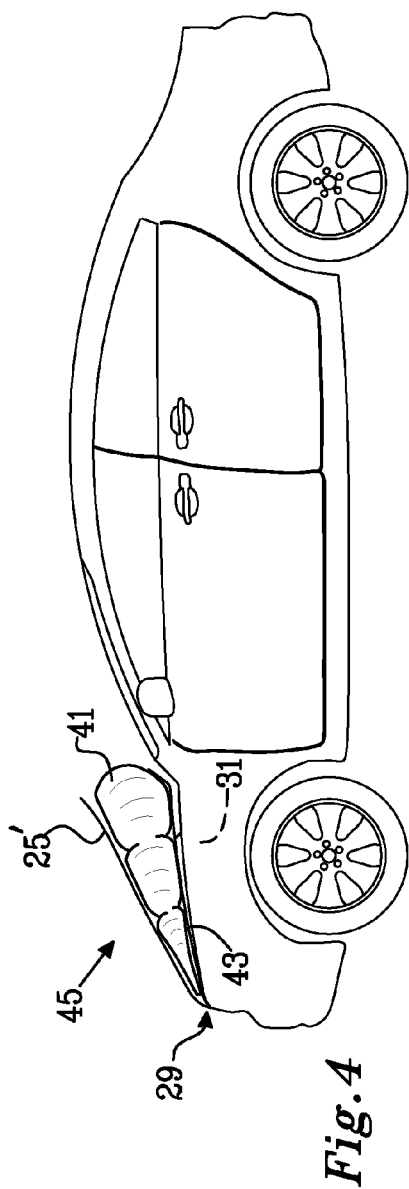

SAFETY ARRANGEMENT FOR A VEHICLE

CROSS REFERENCE TO RELATED APPLICATIONS

The present application claims priority to European Patent Application No. 12196736.8, filed on Dec. 12, 2012, the entire contents of which are hereby incorporated by reference for all purposes.

TECHNICAL FIELD

The present disclosure relates to a safety arrangement for a vehicle. The disclosure further relates to a method for mitigating the consequences of a collision between a vehicle and a large animal.

BACKGROUND

If a motor vehicle, such as a car, is involved in a collision, in which a front part of the vehicle hits a vulnerable road user, such as a pedestrian or a cyclist, the head of the vulnerable road user may impact on the bonnet of the vehicle. The vulnerable road user risks in that case to be severely injured. One parameter, which can affect the severity of the injury, is the fact that the bonnet, which is usually formed from thin metal sheet, would tend to bend, and deform on hard engine parts, such as an engine block, located in an engine compartment beneath the bonnet. In order to reduce the severity of such accidents, it is well-known to use a deployable bonnet, also called a pop-up hood. By raising the rear part of the deployable bonnet to a deployed position, the distance between the bonnet and the hard engine parts is increased, and thereby the consequences of such an impact are mitigated. The focus for using the deployable bonnet is hence to mitigate the consequences for the vulnerable road user being hit by the vehicle.

Moreover, there is also a risk for the vehicle to collide with an animal being on the road. Such a collision may occur when driving at high speed, e.g. in a rural area. If the animal is large, such as a moose, elk, reindeer, deer, kangaroo, cow or horse, a collision may be dangerous. The large animal usually has tall legs. There is therefore a risk that the torso of the large animal is thrown towards the windscreen of the vehicle. This may cause injury to a user of the vehicle and/or damages to the vehicle itself. A particular potentially dangerous case is when the torso of the large animal hits the vehicle close to the centre of the windscreen, since most of the impact energy in that case is received without any help from the A-pillars. If the torso instead hits the vehicle closer to an A-pillar, the A-pillar will help to receive the impact energy.

U.S. Pat. No. 7,997,375 B2 discloses a safety arrangement for a vehicle. In case of a collision with a large animal, the bonnet is slid upwards and rearwards to a position, wherein the bonnet shields the windscreen. However, by sliding the bonnet upwards and rearwards, the engine compartment, or at least a front portion of it, is unshielded. Further, in order to be able to shield the windscreen efficiently, the bonnet probably is rather stiff. This could cause a problem, in case the vehicle instead collides with a vulnerable road user, since it in that case is desirable that the bonnet is at least partly flexible and/or deformable to absorb the impact energy of the vulnerable road user.

The bonnet is in American English known as a hood, but herein the British English term bonnet is used.

SUMMARY

The object of the present disclosure is to overcome or ameliorate at least one of the disadvantages of the prior art, or to provide a useful alternative.

It is desirable to provide a safety arrangement mitigating the consequences of a collision with a large animal for the user of a vehicle and/or the vehicle comprising the safety arrangement.

It is further desirable to provide a safety arrangement, which, in case of a collision between a vulnerable road user and the vehicle comprising the safety arrangement, is forgiving for the vulnerable road user, and yet also safe for the user of the vehicle and/or the vehicle itself, in case of a collision with a large animal.

Thus, in a first aspect of the present invention there is provided a safety arrangement for a vehicle. The safety arrangement comprises a bonnet and at least one support member. In case of a collision between the vehicle and a large animal, the bonnet is supported from beneath by the at least one support member in at least a rear central portion, such that the bonnet forms a ramp for the large animal, the ramp being adapted to direct the large animal over a windscreen and/or a roof structure of the vehicle.

The term "ramp" is herein defined as an inclined plane. The ramp has its low end at the front of the vehicle. However, since a bonnet normally is not flat, but instead has a shape adapted to the design of the vehicle, the bonnet will, at least before being hit by the large animal, retain its shape. The inclined plane then refers to a cross-section of the bonnet through its longitudinal centreline.

The large animal may be a moose, elk, deer, reindeer, kangaroo, cow or horse. It varies from country to country, and from region to region within a country, what kinds of large animals are likely to be present on a road. The large animal is often a wild animal, but may also be a domestic animal, e.g. a cow or a horse on the run from an enclosed pasture. The weight may be above 50 kg, sometimes above 100 kg. Some of the large animals may weigh over 200 kg. An elk may for example weigh between 200 kg and 550 kg. A horse may weigh 600-700 kg.

If the animal instead is small, there is little risk that it will be thrown against the windscreen of the vehicle in case of a collision with the vehicle. More probably, the small animal will be thrown to the side or be run over by the vehicle. Small animals thus constitute a smaller risk of injury for a user of the vehicle and/or damages to the vehicle itself.

The proposed invention aims to mitigate the consequences of a collision with a large animal, in particular a large animal having a torso carried by tall legs, such that the torso would risk to be thrown into the windscreen of the vehicle in case no preventive measures are taken. The legs may be considered to be tall, if the centre of gravity of the body of the wild animal is at a height adjacent to or above the height at a front end of the vehicle.

The ramp is inclined such that the large animal is directed over the windscreen and/or the roof structure of the vehicle. The inclination is optionally selected such that the large animal passes over the vehicle. The selected inclination may depend on factors such as the velocities of the vehicle and the large animal, the kind of animal, the size of the animal, the height of the vehicle and the design of the vehicle.

Optionally, the ramp is inclined, such that the risk of injury for a person located in the passenger compartment is minimized and/or such that the damages to the vehicle are minimized. The large animal may, for example, bounce on the ramp and thereafter move along a path directed partly upwards, such that the large animal passes over the vehicle. The motion of the large animal may be a combination of translational and rotational motion.

When forming a ramp, the bonnet is supported from beneath by the at least one support member in at least a rear central portion. If the animal is large, it is most probable that it will hit the rear portion of the bonnet. Further, a particular potentially dangerous case is when the large animal hits the vehicle close to the longitudinal centre-line of the bonnet, since, in a vehicle according to known technology, the large animal will in that case bounce on the bonnet and hit the windscreen between the A-pillars, whereby most of the impact energy is received without any help from the A-pillars. According to the invention, the bonnet is supported from below, such that the large animal is directed over the windscreen and/or the roof structure of the vehicle. Thus, by supporting at least a rear central portion of the bonnet, the consequences of the potentially most dangerous case are mitigated. Further, the damages to the bonnet itself may be reduced as compared to not using a support member.

Also, the left and/or right rear portions of the bonnet may be supported from below by the at least one support member. This will help if the large animal hits these portions of the bonnet. Further, the front portion of the bonnet may also be supported from below. For example, the at least one support member may support 20%, at least 35%, or at least 50% of the surface of the bonnet.

By using a support member to support the bonnet when forming the ramp, the bonnet itself may be made of a less stiff material. This saves weight. In addition, the consequences for a vulnerable road user colliding with the vehicle are mitigated, since the bonnet in that case may be at least partly deformable to absorb the impact energy of the vulnerable road user. Thereby, the bonnet may fulfil the dual task of being forgiving to a vulnerable road user, and yet being able to direct a large animal over the windscreen and/or the roof structure.

During normal driving or parking of the vehicle, the bonnet may assume a closed position, which is the normal position of the bonnet. The bonnet then covers the engine compartment, when seen from above.

The bonnet is normally displaceable from the closed position to an open position permitting access to the engine compartment of the vehicle, e.g. for service, maintenance or repair work. In order to reach the open position, the bonnet may be pivoted around a pivot axis extending substantially in the lateral direction of the vehicle at or adjacent to a rear end of the bonnet. Alternatively, the bonnet may be pivoted around a pivot axis at or adjacent to the front end of the bonnet to be displaced to the open position. The pivot axis may be formed by a part of the bonnet lock.

When the vehicle is on a flat surface, the bonnet may have an angle of between 5° and 60°, between 10° and 50°, or between 15° and 30° to a horizontal plane of the vehicle awhen forming the ramp, for example. The appropriate angle for the ramp depends on factors such as the velocities of the vehicle and the large animal, the kind of animal, the size of the animal, the height of the vehicle and the design of the vehicle.

When forming the ramp, the bonnet may substantially cover an engine compartment of the vehicle. This is as seen from the position of the large animal before being hit, e.g. from a position in front of the vehicle. Thereby the risk that the large animal would fall into the engine compartment is minimized.

The bonnet may be raisable in order to be able to to form the ramp. A rear portion of the bonnet may be adapted to be raised from the closed position to a ramp position. This is often the case for vehicles having a relatively long bonnet, e.g. between 0.4 and 1.7 m, between 0.7 and 1.5 m, or between 0.8 and 1.3 m. Such bonnets are generally substantially horizontal, e.g. having an angle of between 0° and 20°, or between 5° and 10°, to a horizontal plane of the vehicle, when the vehicle is on a flat surface. For a raisable bonnet, there is also a time factor. The ramp position may be reachable during the short time span being available after having detected a collision or an imminent collision with a large animal, and the moment the large animal hits the bonnet. The bonnet is, when forming the ramp, supported from below in the at least rear central portion by the at least one support member.

Alternatively, and depending on the design of the vehicle, the bonnet may be sufficiently inclined to form the ramp already in the closed, normal position. This is often the case for short bonnets, e.g. between 0.2 and 0.6 meters or between 0.2 and 0.5 meters. In that case, in case of a collision, the at least one support member is activated, such that it will support the bonnet from below, in at least the rear central portion.

In the case that the bonnet is raised for forming the ramp, the whole engine compartment will not be covered, if looking from above the vehicle, due to the inclination of the bonnet forming the ramp. How much of the engine compartment will be covered in that case, will depend on the how far the bonnet has been raised. However, also when seen from above, most of the engine compartment is covered, for example at least 75%, or at least 90%. The uncovered portion of the engine compartment will in that case, when seen from above, be the portion adjacent to the windscreen, since the bonnet substantially maintains its position relative to a body of the vehicle at a front end of the bonnet.

Optionally, the bonnet may be pivotable around a first substantially lateral pivot axis at or adjacent to the front end of the bonnet in order to be raised from the closed position to the ramp position. The pivot axis may be formed by a part of the bonnet lock. As a result of the pivotal movement, the engine compartment is covered, when seen from the position of the large animal before being hit, e.g. from a position in front of the vehicle. If instead seen from above, most of the engine compartment is covered, for example at least 75%, or at least 90%. In particular, the front portion of the engine compartment is covered when seen from above.

If the bonnet is pivoted around a pivot axis at or adjacent to the front end of the bonnet to be displaced to the open position, the same pivot axis may be used for raising the bonnet to the ramp position.

The bonnet may be adapted to, in the ramp position, form a pivot point for the large animal, which has been hit by the vehicle, such that the large animal is given an at least partly rotational motion, optionally rotating over the vehicle and landing behind it. The large animal then changes direction of the movement when bouncing on the bonnet. In some cases, it has been shown to be beneficial if the large animal is given a rotation, since that will help to direct it over the windscreen and/or the roof structure.

The bonnet may be displaceable from the closed position to a deployed position, also called a pop-up position, in which position a gap is provided between the bonnet and the engine compartment. The gap is adapted to mitigate the consequences for a vulnerable road user impacting on the bonnet. By raising at least the rear end of the bonnet to the deployed position, the distance between the bonnet and the hard engine parts is increased, thereby reducing the severity of an accident involving a vulnerable road user impacting on the bonnet. In that case, the bonnet is raised to form the ramp, and the angle of the bonnet when used as the ramp is normally higher than in the deployed position.

One, two, three or more support members may be used. Each support member may comprise at least one support airbag, adapted to support the bonnet from beneath. The at least one support airbag gives the bonnet a solid base, when forming the ramp. The support airbag may be a separate airbag, or may form a portion of an airbag, which also at least partly covers the windscreen and/or the A-pillars. In that case the airbag helps to protect the windscreen. An airbag covering the windscreen and/or the A-pillars may also be useful in case of a collision with a vulnerable road user, since it will dampen the impact on the vulnerable road user, if landing on the windscreen and/or the A-pillars. The at least one support airbag may be triggered by a signal from a collision detection system, which is described further below.

The safety arrangement may further comprise a protective shield located above at least a portion of the engine compartment. If using the at least one support airbag to support the bonnet, the protective shield may be arranged over any sharp part in the engine compartment in order to minimize the risk of the at least one support airbag being punctured during inflation.

The protective shield may be connected to the front end of the bonnet, with the at least one support airbag being located between the bonnet and the protective shield. This helps to minimize the risk of the at least one support airbag being punctured during inflation.

The safety arrangement may further comprise a stiff inner member, the inner member and the bonnet together forming the ramp, the inner member thereby being the at least one support member. The bonnet is deformable for at least partly absorbing a possible impact of a vulnerable road user. The inner member may in that case be sufficiently stiff to be able to redirect the large animal.

The safety arrangement may further comprise a collision detection system. The collision detection system may include non-transient, computer-readable medium including instructions which, when executed by a processor, detect a collision or an imminent collision with a large animal or vulnerable road user. The collision detection system may comprise a remote sensor, e.g. a camera system, an IR camera system, a radar, a lidar, an ultrasonic sensor system, an accelerometer and/or a vehicle dynamics sensor, such as a steering wheel angle sensor. As an alternative, or in addition, the collision detection system may comprise a contact sensor, e.g. a piezoelectric sensor. Based on signals received from one or more sensors, the collision detection system may trigger activation of the safety arrangement. The activation of the safety arrangement may be triggered directly by the remote sensor detecting a large animal and/or vulnerable road user, and/or the triggering may be based on actual contact between the large animal/vulnerable road user and the vehicle. The one or more sensors used by the collision detection system may be located at various positions in the vehicle time depending on type of sensor.

When a large animal is detected, the collision detection system may further be used to identify the kind of animal and to determine geometrical measures such as the height of the legs of a large animal. The collision detection system may also be used to estimate the velocity, e.g. speed and direction, of the large animal. The vehicle also comprises a sensor for its own speed. Thereby, the relative speed of the large animal in relation to the vehicle may be calculated.

The safety arrangement may be combined with other preventive and/or mitigating systems such as a safety system adapted for warning the driver, automatically braking the vehicle and/or steering around the large animal. Accordingly, the collision detection system may communicate with a control system of the vehicle, the control system of the vehicle including non-transient, computer-readable medium including instructions which, when executed by a processor, control operation of the vehicle's engine as well as various vehicle subsystems.

In a second aspect of the present invention, there is provided a vehicle comprising the safety arrangement described above.

In a third aspect of the present invention, there is provided a use of a bonnet of a vehicle to form a ramp for a large animal being hit by the vehicle, such that the large animal is directed away from a windscreen and/or a roof structure of the vehicle. Further, the use of the bonnet may include, when forming the ramp, also substantially covering the engine compartment of the vehicle. Optionally, the use includes supporting the bonnet in at least a rear central portion of the bonnet.

The above use of the bonnet is suitable also at high speeds, or even in particular for high speeds, since the consequences of a collision with a large animal are more severe at high speeds than at low speeds. Purely as an example, the use is appropriate for speeds above 35 km/h, above 50 km/h, or above 70 km/h.

Further, collisions with large animals tend to occur on roads in rural areas. This differs from collisions with vulnerable road users, which tend to occur in urban areas and with vehicles travelling at low speed, e.g. below 50 km/h or below 35 km/h. Therefore, it is possible, and appropriate, to use bonnet to form the ramp for higher speeds than for forming the deployed position.

In a fourth aspect of the present invention, there is provided a method of mitigating the consequences of a collision between a vehicle and a large animal, the method comprising the steps of: detecting a collision or an imminent collision between the vehicle and the large animal, the at least one support member supporting the bonnet from beneath in at least a rear central portion, such that the bonnet forms a ramp for the large animal, the ramp being adapted to direct the large animal over a windscreen and/or a roof structure of the vehicle.

The at least one support member may be at least one support airbag or a stiff inner member.

The method may further comprise the step of pivoting the bonnet around a first substantially lateral pivot axis at or adjacent to a front end of the bonnet in order to form the ramp.

BRIEF DESCRIPTION OF THE DRAWINGS

The present invention will hereinafter be further explained by means of non-limiting examples with reference to the appended drawings wherein:

FIG. 2a-d illustrate a vehicle with a safety arrangement according to a first embodiment of the invention, FIG. 3 illustrates different portions of a bonnet, FIG. 4 illustrates a vehicle with a safety arrangement according to a second embodiment of the invention.

It should be noted that the appended drawings are not necessarily drawn to scale and that the dimensions of some features of the present invention may have been exaggerated for the sake of clarity.

DETAILED DESCRIPTION

The invention will, in the following, be exemplified by non-limiting embodiments. It should however be realized that the embodiments are included in order to explain principles of the invention and not to limit the scope of the invention, defined by the appended claims. Details from two or more of the embodiments may be combined with each other.

Figure 1A:
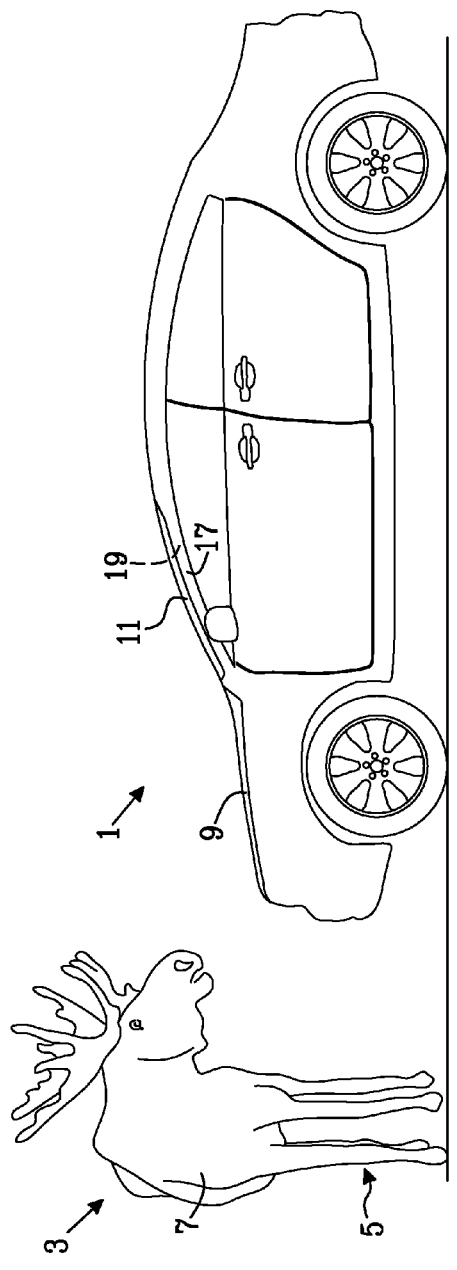
FIG. 1a-c illustrate a vehicle according to prior art colliding with an elk.
Figure 1B:
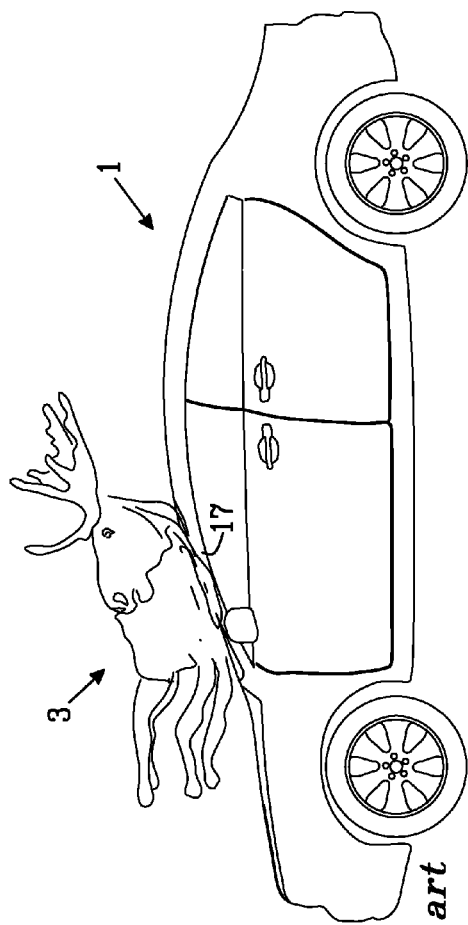
Figure 1C:
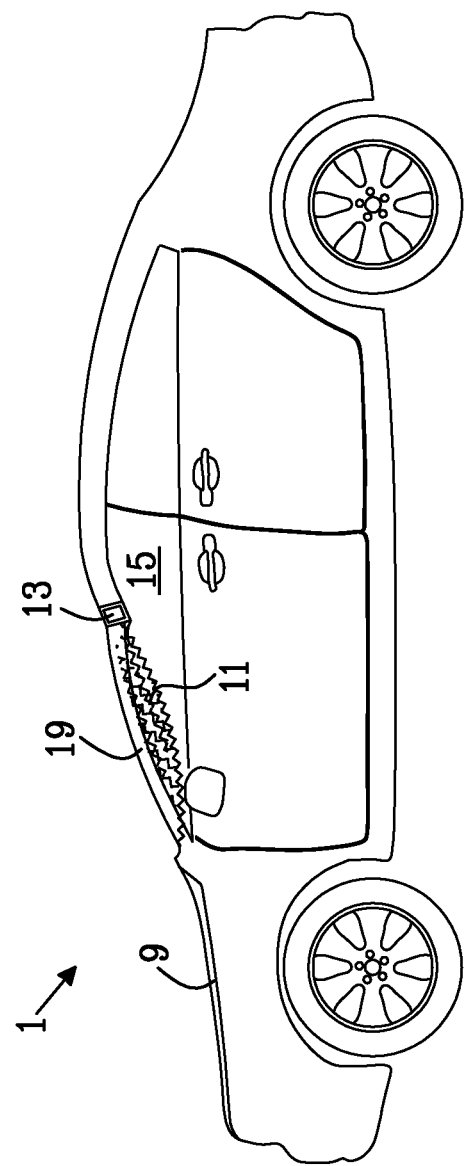

FIG. 1a schematically illustrates a vehicle 1 according to prior art colliding with a large animal (e.g. elk) 3. The bonnet 9 is in its normal closed position. The elk 3 has tall legs 5, such that, when hit by the vehicle 1, its torso 7 will fly over a bonnet 9 of the vehicle 1 and hit a windscreen 11, see FIG. 1b. Thereby, the windscreen 11 and a roof beam 13 of the vehicle 1 will be pressed into a passenger compartment 15 of the vehicle 1, see FIG. 1c. The example illustrates a case when the elk 3 hits the vehicle 1 between A-pillars 17, 19, e.g. most of the impact energy is received without any help from the A-pillars 17, 19. As a result of the high energy of the impact, the windscreen 11 and the roof beam 13 will be deformed and bulge into the passenger compartment 15, as seen in FIG. 1c.

FIGS. 2a-d illustrate a vehicle 21 with a safety arrangement 23 according to a first embodiment of the invention.

As shown, vehicle 21 includes a control system 46. Control system 46 includes a controller 50, which may be any electronic control system of vehicle 21. Controller 50 may be configured to make control decisions based at least partly on input from one or more sensors 54 of the vehicle, and may control actuators 52 based on the control decisions. For example, controller 50 may store computer-readable instructions in memory, and actuators 52 may be controlled via execution of the instructions.

The safety arrangement 23 comprises a bonnet 25 and a support member, here a support airbag 41. The safety arrangement 23 further comprises a collision detection system 27. As noted above, collision detection system 27 may include one or more sensors, e.g. one or more sensors 54, and may trigger activation of the safety arrangement 23 via one or more actuators, e.g. one or more actuators 52. Further, collision detection system 27 may communicate with and work in conjunction with control system 46.

With reference to FIG. 2a, since the collision detection system 27 has determined that a collision with a large animal, here the elk 3, is unavoidable, the safety arrangement 23 is activated. The bonnet 25 is raised to a ramp position by pivoting around a front end 29 of the bonnet 25, such that the bonnet 25 forms a ramp. In cross section, the bonnet 25 forms an inclined plane having an angle α to a horizontal plane, the angle α being between 5° and 60°, between 10° and 50°, or between 15° and 30° to the horizontal plane. The bonnet 25 is supported from below by the at least one support member, e.g. the support airbag 41 in the example shown in FIGS. 2a-d, which is inflated when the safety arrangement 23 is activated.

The bonnet 25 is further displaceable from the closed position to a deployed position, not illustrated, in which deployed position a gap is provided between the bonnet 25 and the engine compartment 31. By raising at least a rear portion 39 of the bonnet 25 to the deployed position, the distance between the bonnet 25 and the hard engine parts is increased, thereby reducing the severity of an accident involving a vulnerable road user impacting on the bonnet 25. This is a known technical solution used in order to mitigate the consequences for a vulnerable road user impacting on the bonnet 25.

However, the demands for a bonnet 25 in the deployed position, e.g. being "friendly" to a vulnerable road user in a collision with the vehicle 21 are at least partly contradictory to the demands on a bonnet 25 when colliding with a large animal 3 when forming the ramp, e.g. avoiding injury for a user of the vehicle 21 and/or damages to the vehicle 21 itself. In order to redirect the large animal, the safety arrangement 23 is desired to be stable enough for withstanding the impact energy. This could cause a problem, in case the vehicle 21 instead collides with a vulnerable road user, since it in that case, it is desirable that the bonnet 25 is at least partly flexible and/or deformable to absorb the impact energy of the vulnerable road user.

In the shown embodiment, this apparent contradiction is solved by arranging the least one support airbag 41 beneath the bonnet 25. The support airbag 41 is in the illustrated embodiment a separate airbag, but may alternatively form a portion of an airbag which also at least partly covers the windscreen 35 and/or the A-pillars. An airbag covering the windscreen and/or the A-pillars may be useful in case of a collision with a vulnerable road user, since it will dampen the impact on the vulnerable road user, when landing on the vehicle.

The support airbag 41 supports at least the rear portion 39 of the bonnet 25, since it is most probable that a large animal 3 will hit the rear portion 39 of the bonnet 25. In particular, it supports the rear central portion 44e. The different portions of the bonnet 25 will be described below in conjunction with FIG. 3. By using the support airbag 41 to support the bonnet 25 from beneath when forming the ramp, the bonnet 25 may be manufactured of a less stiff material. This saves weight. In addition, the consequences for a vulnerable road user colliding with the vehicle 21 are mitigated, since the bonnet 25 in that case is at least partly flexible to absorb the impact energy of the vulnerable road user. The at least one support airbag 41 may support 25%, at least 50%, or at least 75% of the surface of the bonnet. Thereby, the bonnet 25 may fulfil the dual task of being friendly to a vulnerable road user and yet being able to direct a large animal 3 over the windscreen 35 and/or a roof structure 33.

The support airbag 41 may further be used to raise the bonnet 25 in order to move it to the ramp position, when the safety arrangement 23 is activated. Alternatively, or in addition, the bonnet 25 may be raised by a pyrotechnic means, a spring member, and/or a piston.

In order to protect the support airbag 41 from being punctured during inflation and when inflated, a protective shield 43 may be arranged in the engine compartment 31, such that the protective shield 43 covers any sharp part in the engine compartment 31, which otherwise would pose a potential risk for puncturing the support airbag 41.

If the bonnet 25 instead is moved to the deployed position, not illustrated, e.g. in case of a collision with a vulnerable road user, the support airbag 41 may be partly inflated, such that it softens the impact of the vulnerable road user on the bonnet 25.

The collision detection system 27 may further be used to identify kind of animal and to determine geometrical measures such as height of the legs 5 of the animal. The appropriate angle α for the ramp position depends on factors such as the velocities of the vehicle and the large animal, the kind of animal, the size of the animal, the height of the vehicle and the design of the vehicle. There is also a time factor. The ramp position may be reached during the short time span being available after having detected a collision or imminent collision with the large animal. For example, in the illustrated embodiment, the large animal is an elk 3, which is known to have tall legs 5. The ramp position is thus chosen such that the elk 3 hits the bonnet 25, bounces on it and is thrown over the vehicle 21. See FIGS. 2b-c.

When forming the ramp, the bonnet 25 substantially covers an engine compartment 31 of the vehicle 21. This is as seen from a position in front of the vehicle 21, e.g. from the perspective of the large animal. Therefore the risk that the large animal will fall into the engine compartment 31 is minimized. However, if looking from above the vehicle, the whole engine compartment 31 will not be covered due to the inclination of the bonnet 25 in the ramp position. However, also when seen from above, most of the engine compartment 31 is still covered, for example at least 75% or at least 90% of the engine compartment is still covered. For example, in the illustrated embodiment the angle α is about 20° to the horizontal plane. Accordingly, about 94% of the engine compartment 31 is covered in the ramp position, since cos 20°=0.94. In particular, the front portion of the engine compartment 31 is covered when seen from above.

The bounce on the bonnet 25 redirects the elk 3, such that it flies over the roof structure 33 of the vehicle 21. See FIG. 2c. After the bounce on the bonnet 25, the elk 3 is given a partly rotational motion. Most probably, the elk 3 will land behind the vehicle 21. See FIG. 2d. A windscreen 35 and a roof beam 37 of the vehicle 21 are hence unaffected by the collision. The bonnet 25 may be arranged to be replaceable to the closed position after the collision.

FIG. 3 illustrates different portions of the bonnet 25. The bonnet 25 is divided into a rear portion 39 and a front portion 40 by a first line $L_1$ running in the lateral direction of the vehicle 21. The rear portion 39 and the front portion 40 may each form substantially half of the bonnet 25, with the rear portion 39 being closest to the windscreen 35 of the vehicle.

Further, the bonnet 25 is divided into a right portion 42a, a central portion 42b and a left portion 42c by a second line $L_2$ and a third line $L_3$, running in the longitudinal direction of the vehicle. Thereby, a front right portion 44a, a front central portion 44b, a front left portion 44c, a rear right portion 44d, a rear central portion 44e and a rear left portion 44f are defined.

As already mentioned above, a particular potentially dangerous case is when the large animal, e.g. the elk, hits the vehicle close to the longitudinal centre-line of the bonnet, since in a vehicle according to known technology, the large animal will in that case bounce on the bonnet and hit the windscreen between the A-pillars, whereby most of the impact energy is received without any help from the A-pillars. However, according to the invention, the bonnet 25 is supported from below in at least the rear central portion 44e, such that the large animal, e.g. the elk 3, is directed over the windscreen 35 and/or the roof structure 37 of the vehicle. Thus, by supporting at least the rear central portion 44e, the consequences of the potentially most dangerous case are mitigated.

If the large animal, e.g. the elk 3, instead bounces on the rear right portion 44d, or on the rear left portion 44f, the A-pillar 17, 19 would absorb part of the impact energy, if the elk 3 would impact on the windscreen 35. However, it would be beneficial if the support member also supports the rear right portion 44d, and/or the rear left portion 44f, since the damages to the vehicle thereby will be reduced, and there is a less risk of injury to the user and/or damages to the vehicle.

It may further also be beneficial if the support member, at least partly, can support the front portion 40 of the bonnet 25, e.g. if the vehicle collides with a small animal, which may land on the front portion 40 of the bonnet 25.

FIG. 4 illustrates a second embodiment of a safety arrangement 45 according to the invention. A bonnet 25' is at its front end 29 connected to a protective shield 43. The bonnet 25' forms an exterior surface, which is deformable for at least partly absorbing a possible impact of a vulnerable road user (not illustrated). The bonnet 25' is displaceable from the closed position to the ramp position, which is illustrated in FIG. 4. The support airbag 41 is located between the protective shield 43 and the bonnet 25', such that the bonnet 25' is supported from beneath by the support airbag 41 when forming the ramp. The protective shield 43 is located above at least a portion of the engine compartment 31, such that it minimizes the risk of the support airbag 41 being punctured during inflation.

If the bonnet of the safety arrangement 45 instead is moved to a deployed position, not illustrated, e.g. in case of a collision with a vulnerable road user, the support airbag 41 may be partly inflated, thereby providing a gap between the rear portion 39 of the bonnet 25' and the protective shield 43. The partly inflated support airbag 41 may in that case be used to soften the impact for the vulnerable road user.

FIG. 5a-d illustrate a third embodiment of a safety arrangement 51 according to the invention, comprising a bonnet 25" and a stiff inner member 53. The bonnet 25" forms an exterior surface, which is deformable for at least partly absorbing a possible impact of a vulnerable road user. The inner member 53 and the bonnet 25" are connected via a connecting member 57, such that they can be moved together. In the illustrated embodiment, the connecting member 57 is a hinged connection comprising a hinge 59.

Figure 5A:
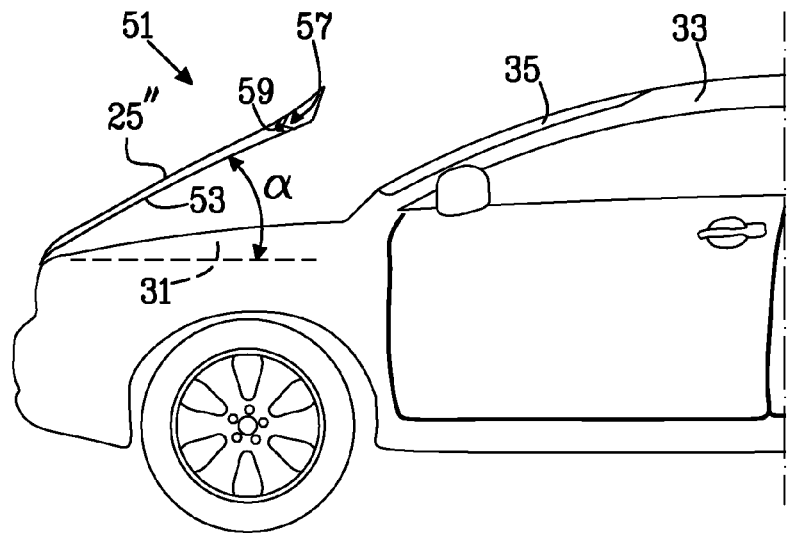
FIG. 5a-d illustrate a vehicle with a safety arrangement according to a third embodiment of the invention.
Figure 5B:
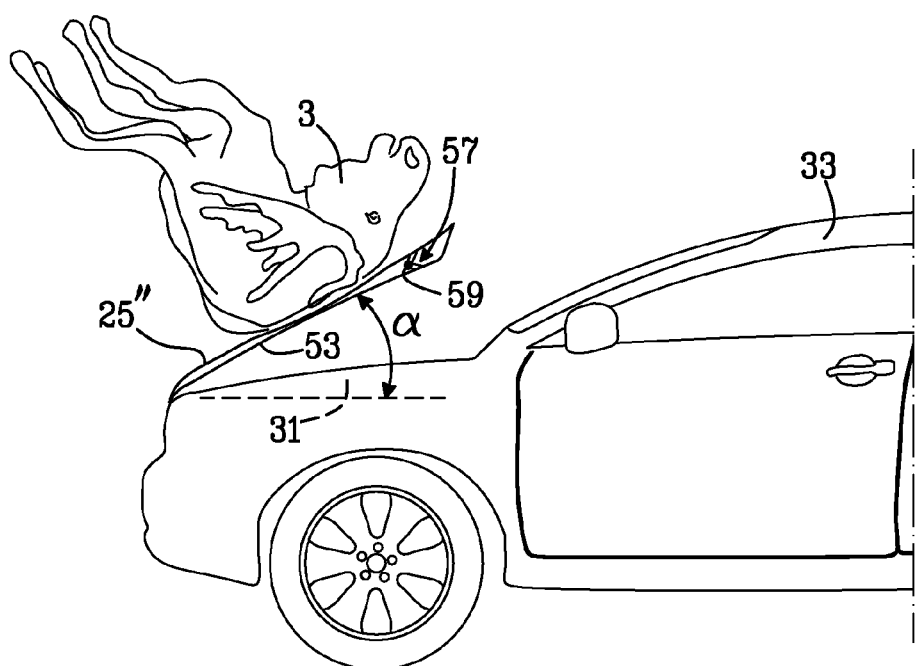

In the closed position, the connecting member 57 is folded at the hinge 59, such that the inner member 53 and the bonnet 25" are close to each other. The inner member 53 and the bonnet 25" are displaceable together from the closed position to the ramp position, which is illustrated in FIG. 5a. Also in the ramp position, the connecting member 57 is folded at the hinge 59, and the inner member 53 and the bonnet 25" are close to each other.

When the large animal 3 impacts with the bonnet, the bonnet 25" deforms. See FIG. 5b. However, the inner member 53 is stiff and forms the ramp together with the bonnet 25", e.g. the inner member 53 acts as a support member for the bonnet 25". The inner member 53 is optionally stiff enough to be able to redirect the large animal, such that it moves over the windscreen 35 and the roof structure 33.

Figure 5C:
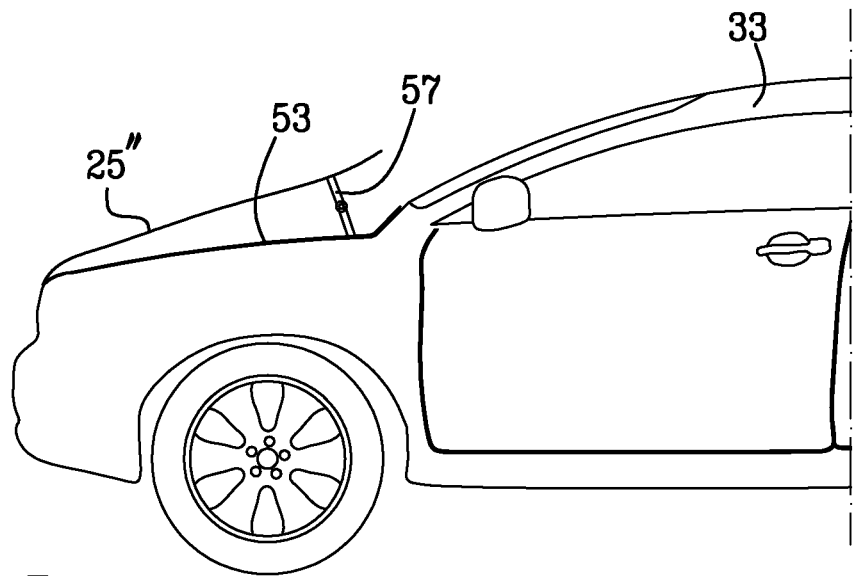
Figure 5D:
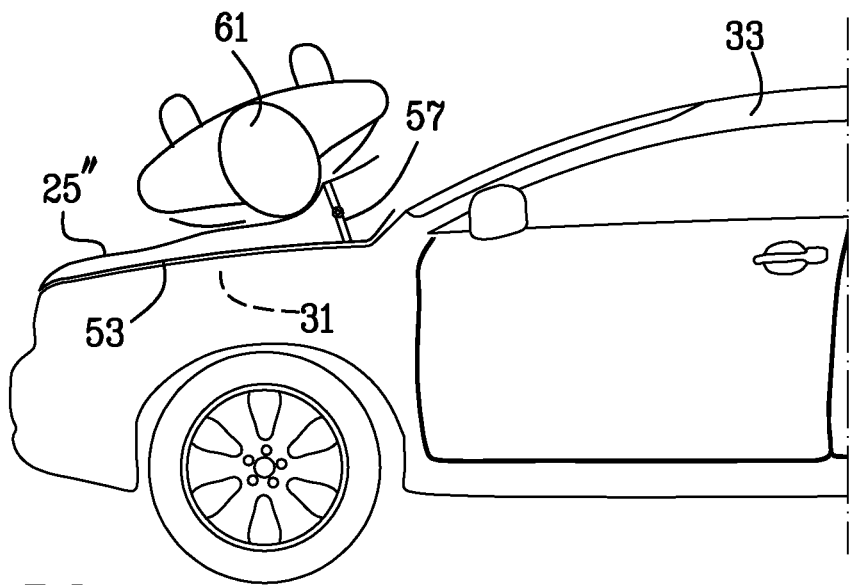

In case of a collision with a vulnerable road user, the bonnet 25" of the safety arrangement 51 is instead moved to a deployed position, see FIG. 5c. The connecting member 57 then provides a gap between the inner member 53 and the bonnet 25". The connecting member 57 is therefore in a raised position providing the gap between the inner member 53 and the bonnet 25". In addition, there may be a gap between the inner member 53 and the engine compartment 31.

The bonnet 25" member will deform due to the impact with the vulnerable road user 61 and absorb impact energy. The inner member 53 will cover any hard and/or sharp parts in the engine compartment 31. See FIG. 5d.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A safety arrangement for a vehicle, said safety arrangement comprising:
   a bonnet supported from beneath by at least one support air bag in at least a rear central portion of the bonnet; and
   a collision detection system including a non-transient, computer-readable medium including instructions which, when executed by a processor:
      detect a collision or an imminent collision with a large animal or a vulnerable road user;
      upon detection of a collision or an imminent collision with a large animal, trigger displacement of the bonnet from a closed position to a ramp position, wherein in the ramp position, the bonnet forms a ramp for the large animal and is arranged at a first angle to a horizontal plane of said vehicle, said ramp being adapted to direct said large animal over a windscreen and/or a roof structure of said vehicle; and upon detection of a collision or an imminent collision with a vulnerable road user, trigger displacement of the bonnet from the closed position to a deployed position, wherein in the deployed position, the bonnet is arranged at a second angle to the horizontal plane of said vehicle, the first angle higher than the second angle, the deployed position being adapted to mitigate the consequences for the vulnerable road user impacting on said bonnet.

2. The safety arrangement according to claim 1, wherein said bonnet, when in the ramp position, has an angle of between 5° and 60° to the horizontal plane of said vehicle.

3. The safety arrangement according to claim 1, wherein said bonnet, when in the ramp position, substantially covers an engine compartment of said vehicle.

4. The safety arrangement according to claim 3, further comprising a protective shield located above at least a portion of said engine compartment.

5. The safety arrangement according to claim 4, wherein said protective shield is connected to a front end of said bonnet and said at least one support airbag is located between said bonnet and said protective shield.

6. The safety arrangement according to claim 1, wherein a rear portion of said bonnet is adapted to be raised from the closed position to the ramp position to form said ramp.

7. The safety arrangement according to claim 6, wherein said bonnet is pivotable around a first substantially lateral pivot axis at or adjacent to a front end of said bonnet in order to be raised from said closed position to said ramp position.

8. The safety arrangement according to claim 1, wherein said at least one support airbag is adapted to support said bonnet from beneath.

9. The safety arrangement according to claim 8, wherein the support airbag does not cover the windscreen or A-pillars of the vehicle.

10. The safety arrangement according to claim 8, wherein the support airbag forms a portion of an airbag which also at least partly covers the windscreen and/or A-pillars of the vehicle.

11. The safety arrangement according to claim 1, wherein said safety arrangement further comprises a stiff inner member, said inner member and said bonnet together forming said ramp, said inner member thereby being said at least one support member.

12. The safety arrangement according to claim 1, further comprising a collision detection system for detecting a collision or imminent collision with a large animal.

13. A method of mitigating the consequences of a collision between a vehicle comprising a safety arrangement and a large animal or a vulnerable road user, said method comprising the steps of:

detecting a collision or an imminent collision between said vehicle and a large animal or vulnerable road user; and then upon detection of a collision or an imminent collision with a large animal, triggering displacement of a bonnet of the vehicle from a closed position to a ramp position, wherein in the ramp position, the bonnet is arranged at a first angle to a horizontal plane of said vehicle and forms a ramp for said large animal, said ramp comprising at least one support air bag supporting the bonnet from beneath at least a rear central portion of the bonnet, and said ramp directing said large animal over a windscreen and/or a roof structure of said vehicle after the collision; and upon detection of a collision or an imminent collision with a vulnerable road user, triggering displacement of the bonnet from the closed position to a deployed position in which the bonnet is arranged at a second angle to the horizontal plane of said vehicle, the first angle higher than the second angle, said deployed position adapted to mitigate the consequences for a vulnerable road user impacting on said bonnet.

14. The method of claim 13, further comprising the step of:
pivoting said bonnet around a first substantially lateral pivot axis at or adjacent to a front end of said bonnet in order to displace said bonnet from the closed position to the ramp position or the deployed position.

15. The method of claim 13, wherein the at least one support airbag supports at least the rear central portion of the bonnet from beneath, and wherein inflation of the support airbag displaces the bonnet to the ramp position or the deployed position.

* * * * *